United States Patent [19]
Lochkovic et al.

[11] Patent Number: 6,053,085
[45] Date of Patent: Apr. 25, 2000

[54] RIBBON SEPARATION TOOL AND METHOD FOR SEPARATING AN OPTICAL FIBER RIBBON

[75] Inventors: Gregory A. Lochkovic, Hickory, N.C.; Richard H. Purdue, Byron, Minn.

[73] Assignee: Siecor Corporation, Hickory, N.C.

[21] Appl. No.: 08/967,805

[22] Filed: Nov. 12, 1997

[51] Int. Cl.[7] .................... B26D 1/09; B26D 7/01
[52] U.S. Cl. .................... 83/618; 83/440.1; 83/448; 83/563; 83/590; 83/694; 385/134
[58] Field of Search .................... 269/43, 44, 900, 269/909; 83/530, 516, 517, 567, 569, 924, 945, 953, 440, 440.1, 444, 448, 441, 874, 566, 563, 588, 590, 618, 619, 632, 648, 694; 81/9.4; 385/134, 135; 29/564.1, 564.3

[56] References Cited

U.S. PATENT DOCUMENTS

| | | | |
|---|---|---|---|
| 2,435,660 | 2/1948 | Tileston | 83/924 X |
| 3,314,321 | 4/1967 | Fauconniere | 83/444 X |
| 3,575,329 | 4/1971 | Hannabery | 225/97 |
| 3,709,081 | 1/1973 | Rush | 83/444 |
| 4,046,045 | 9/1977 | Stevens | 83/618 X |
| 4,179,964 | 12/1979 | Kirkgasser et al. | 83/599 |
| 4,230,008 | 10/1980 | Fornwalt | 83/456 |
| 4,589,319 | 5/1986 | Litehizer, Jr. | 83/444 X |
| 4,979,413 | 12/1990 | Beller | 83/444 |
| 5,093,992 | 3/1992 | Temple et al. | 30/90.8 |
| 5,107,735 | 4/1992 | Ramun et al. | 83/924 X |
| 5,457,762 | 10/1995 | Lochkovic et al. | 385/114 |
| 5,524,166 | 6/1996 | Osaka et al. | 385/134 |
| 5,561,730 | 10/1996 | Lochkovic et al. | 385/114 |
| 5,685,945 | 11/1997 | Mock et al. | 156/584 |
| 5,806,394 | 9/1998 | Marocco | 83/566 X |
| 5,926,598 | 7/1999 | Klein | 385/137 |

FOREIGN PATENT DOCUMENTS

| | | | |
|---|---|---|---|
| 794447A1 | 10/1997 | European Pat. Off. | G02B 6/44 |
| 2-153305 | 6/1990 | Japan | G02B 6/44 |
| 08075929A | 3/1996 | Japan. | |

OTHER PUBLICATIONS

1991 IEICJ Spring General Meeting; pp. 32 thru 4–36.

*Primary Examiner*—Rinaldi I. Rada
*Assistant Examiner*—Charles Goodman
*Attorney, Agent, or Firm*—Timothy J. Aberle

[57] ABSTRACT

A ribbon separation tool (10) for separating optical fiber ribbons (C1,C2,C3) into subsets of optical fibers. Ribbon separation tool (10) includes a stationary shearing device (27), and a moveable shearing device (17), the moveable shearing device (17) is operative to move relative to the stationary shearing device (27) during a shearing stroke. Optical fiber ribbon support members (42), with optical fiber ribbon receiving slots (46) being defined therebetween, are adjacent shearing devices (17,27). Moveable shearing device (17) is moveably located between optical fiber ribbon support members (42) and includes moveable sub-slots (90a,90b,90c). When a cover member (26) of tool (10) is in a closed position, stationary sub-slots (92a,92b,92c) of stationary shearing device (27) are aligned with moveable sub-slots (90a,90b,90c) to define shearing slots (90a, 92a;90b,92b;90c,92c). Shearing slots (90a,92a;90b, 92b;90c,92c) are each sized to receive a respective optical fiber ribbon (C1,C2,C3), and each shearing slot straddles a shearing plane (M) defined between shearing devices (17, 27). When tool (10) is actuated by pushing a pusher member (52) to an actuated position, ribbon (C1) will be separated into two 6-fiber subsets, ribbon (C2) will be separated into one 4-fiber and one 8-fiber subset, and ribbon (C3) will be separated into one 2-fiber subset and one 10-fiber subset. With pusher member (52) in the actuated position, optical fiber ribbons (C1,C2,C3) are then moved lengthwise whereby ribbons (C1,C2,C3) are separated lengthwise.

10 Claims, 10 Drawing Sheets

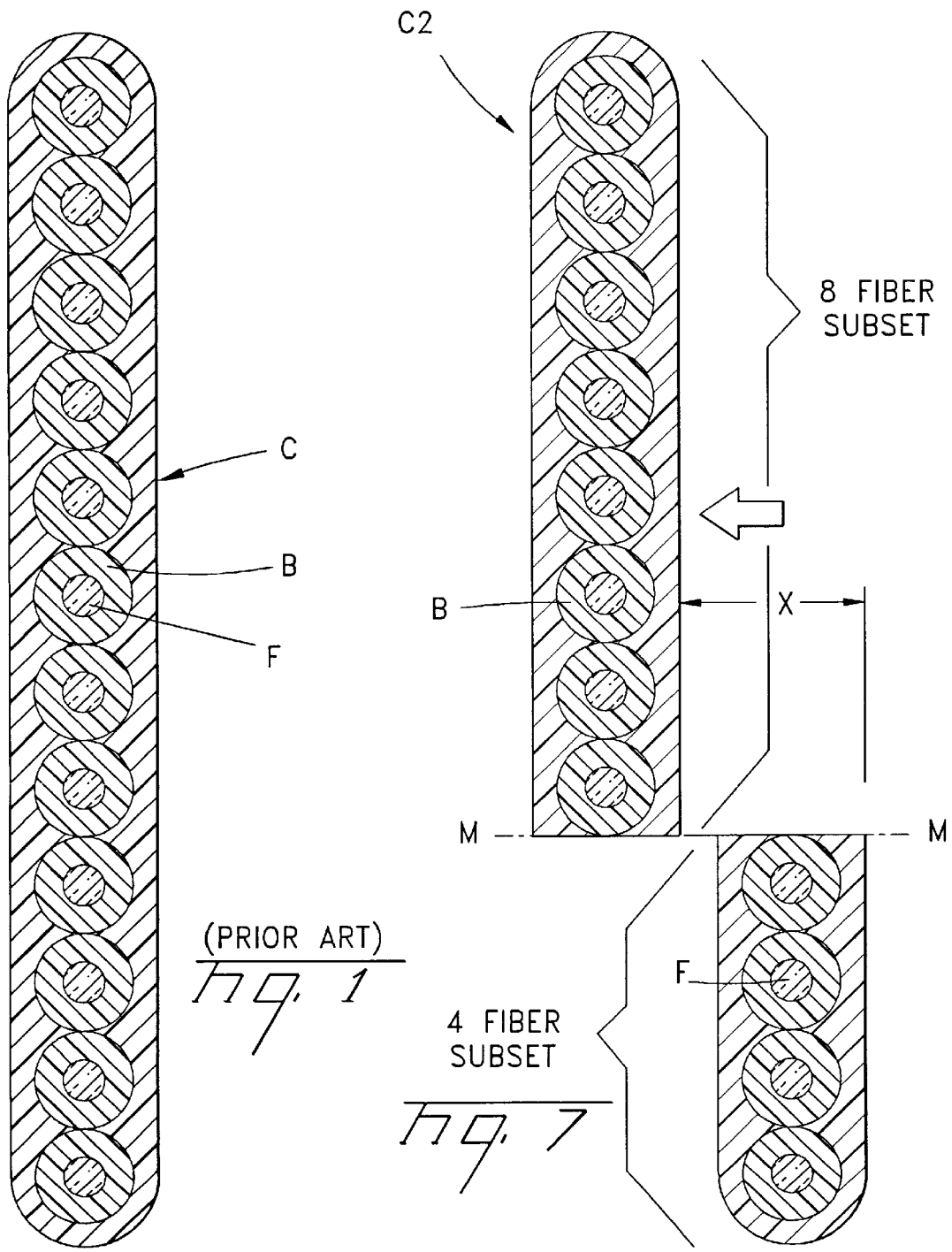

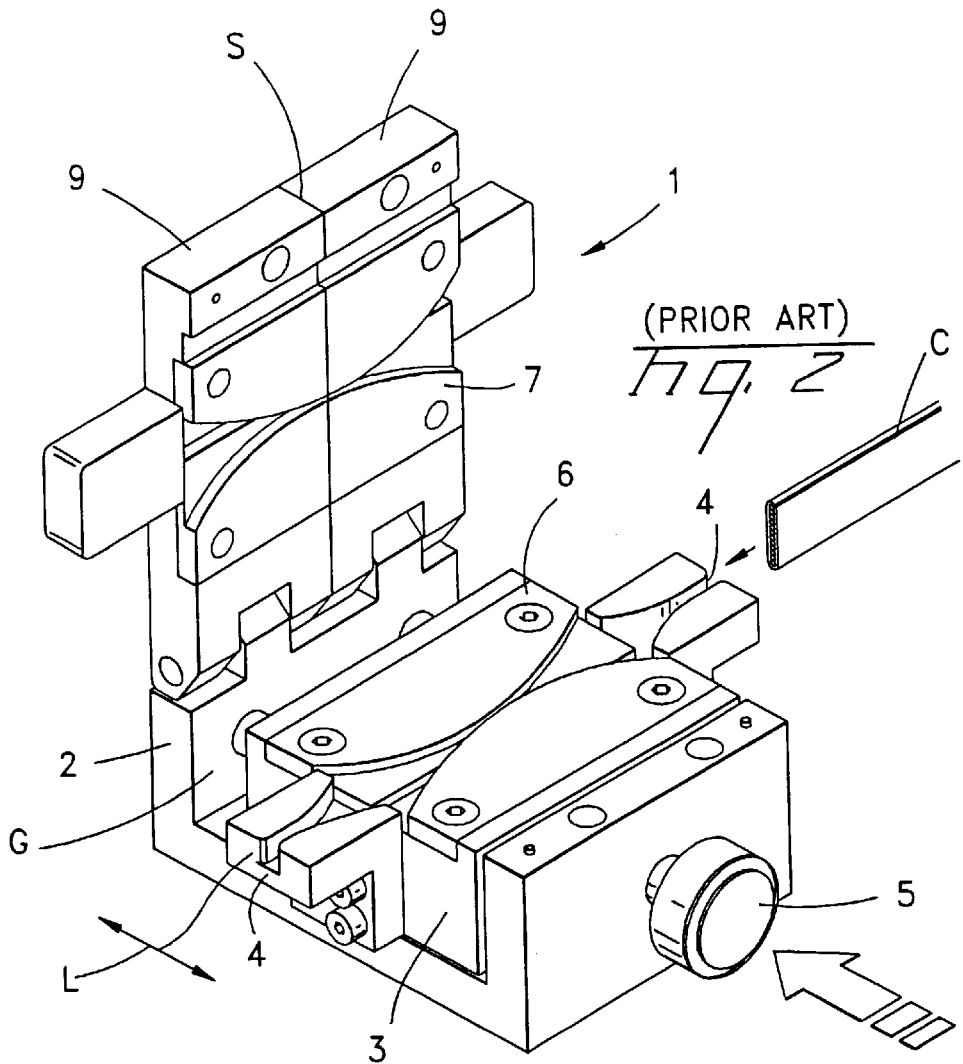
(PRIOR ART) Fig. 2
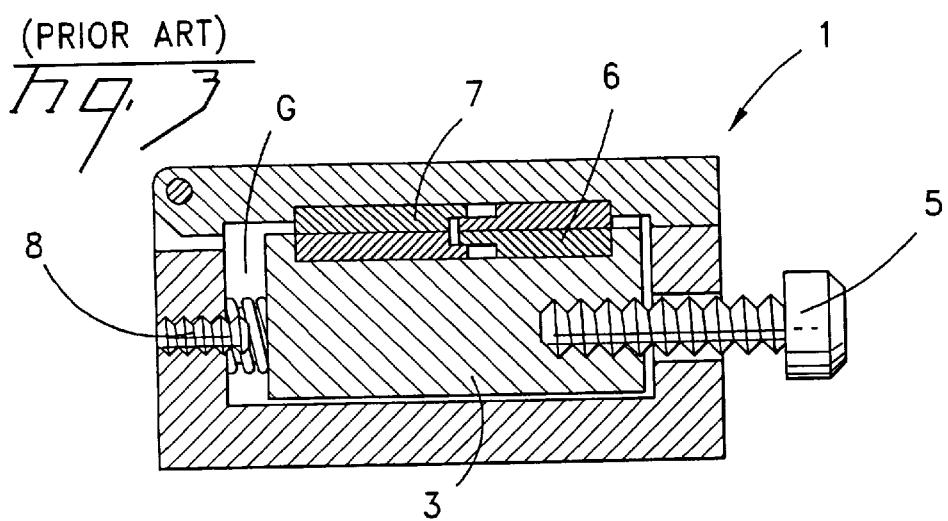
(PRIOR ART) Fig. 3

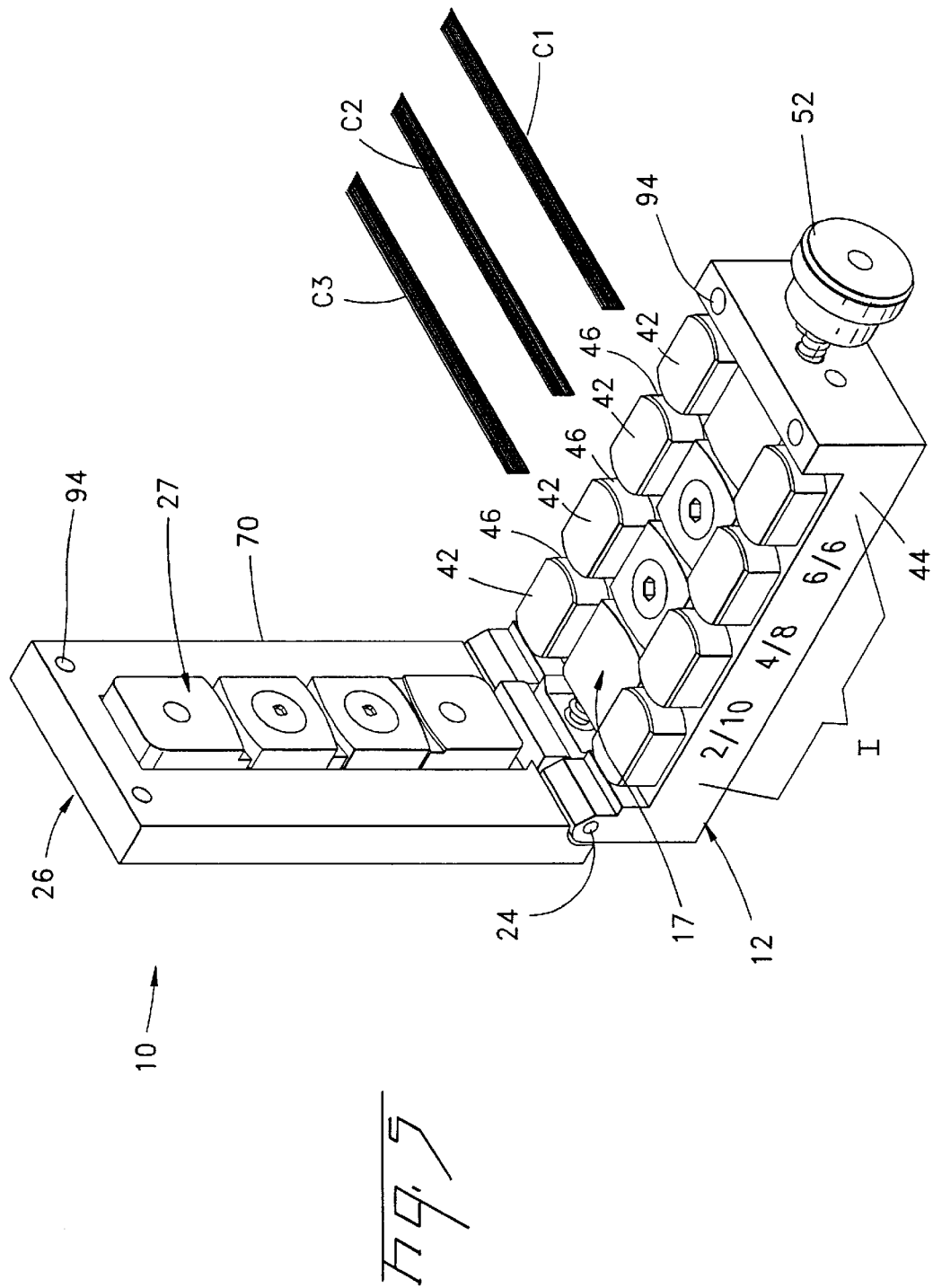

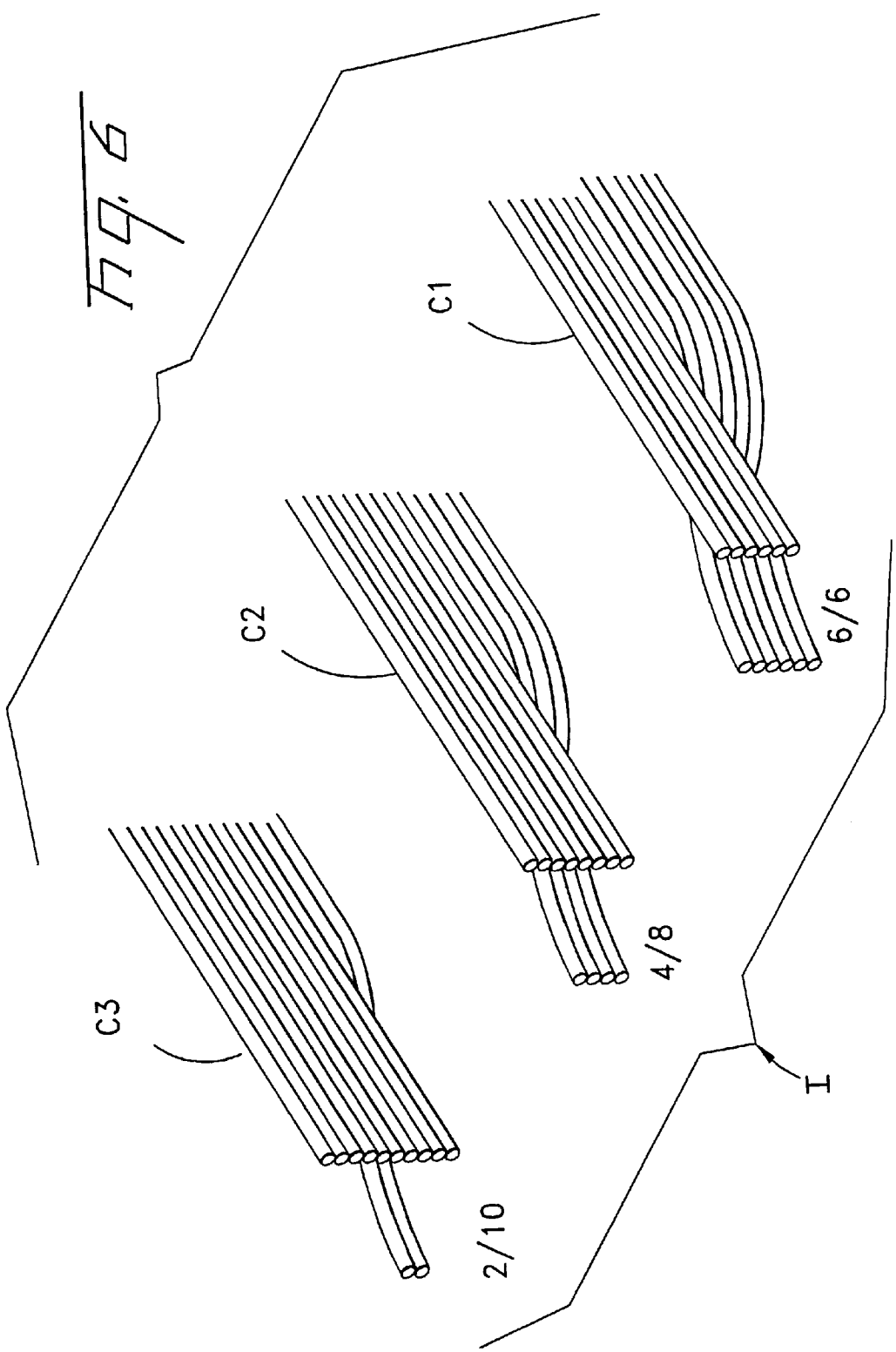

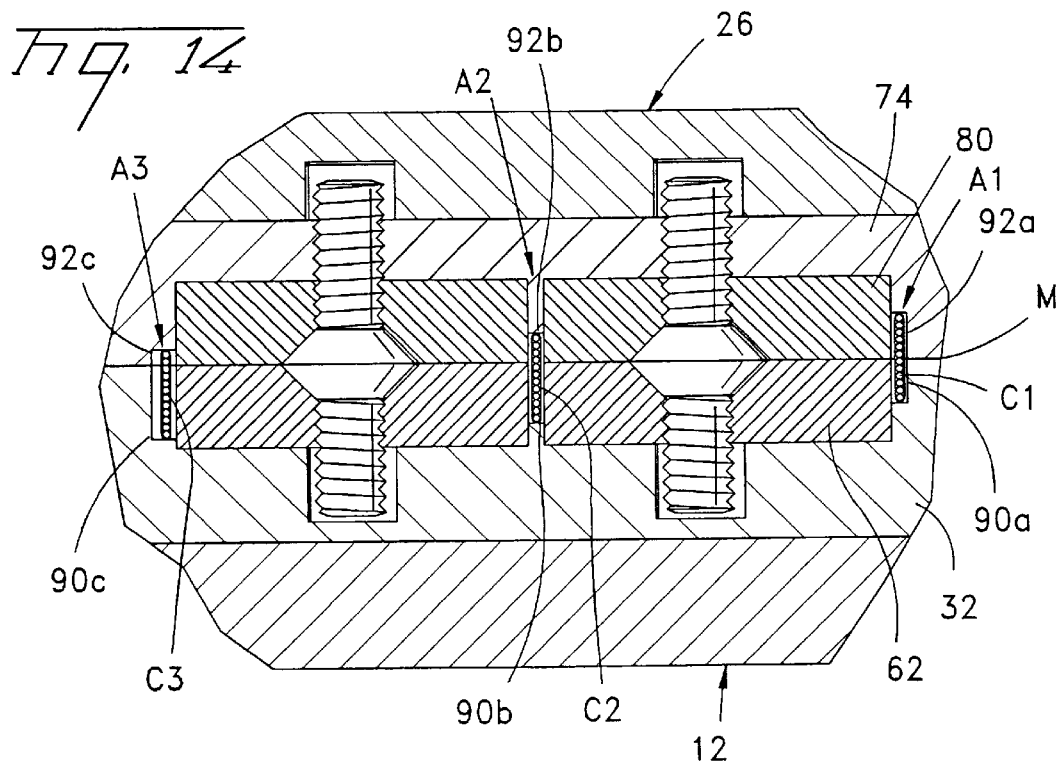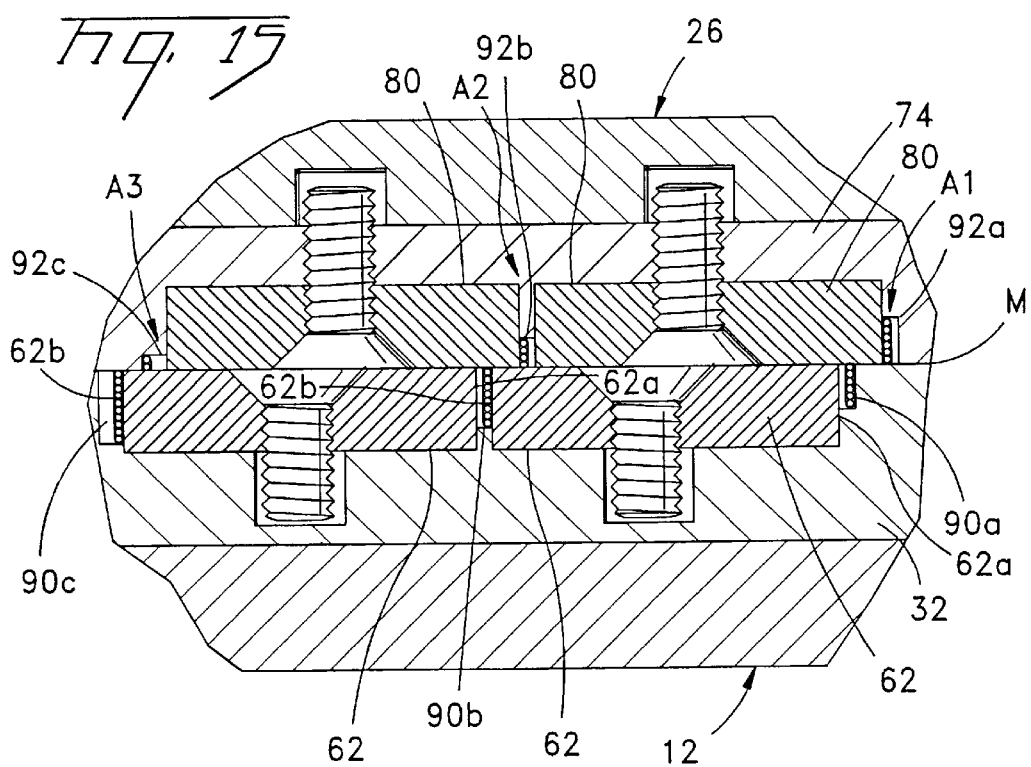

RIBBON SEPARATION TOOL AND METHOD FOR SEPARATING AN OPTICAL FIBER RIBBON

FIELD OF THE INVENTION

The present invention is directed to a tool for use in the preparation of optical fibers for connectorization, and, more particularly, to a ribbon separation tool for separating one or more optical fiber ribbons into subsets of optical fibers.

BACKGROUND OF THE INVENTION

A fiber optic cable may include one or more optical fiber ribbons capable of transmitting voice, television, or computer data information. Examples of optical fiber ribbons are disclosed in U.S. Pat. Nos. 5,561,730 and 5,457,762, which are incorporated herein by reference. Optical fiber ribbons may be made by arranging a plurality of optical fibers in planar relationship, and then extruding a common matrix coating, such as a UV curable acrylate material, about the optical fibers. FIG. 1 is an enlarged cross sectional view of a conventional optical fiber ribbon C with twelve optical fibers F, each fiber having a respective buffer layer B. Conventional optical fiber ribbons C may or may not have spaces between adjacent buffer layers B. Often the connectorization of optical fibers F requires ribbon C to be separated into optical fiber subsets. The respective ends of the subsets are then stripped of the common matrix coating, and buffer layers B are removed thereby exposing the optical fibers. The optical fibers are then ready for connectorization.

FIGS. 2 and 3 illustrate a known ribbon separation tool 1 used for separating a single optical fiber ribbon into optical fiber subsets. Ribbon separation tool 1 comprises a housing 2 mounting a reciprocal member 3. Reciprocal member 3 is moveable along a line of action L when a pressing force is applied to a button 5. Ribbon receiving slots 4 are arranged to receive a single optical fiber ribbon C. Reciprocal member 3 includes blades 6 fastened thereto, which blades are designed to shear optical fiber ribbon C in a shearing stroke of reciprocal member 3. Cooperating with and hingedly mounted to the housing base is a pair of cover members 9 which are separated by a slit S. Each cover member 9 includes respective shearing blades 7 that cooperate with blades 6 to effect shearing of optical fiber ribbon C. Maintaining pressure on button 5, and at the same time pulling sheared optical fiber ribbon C to its end, results in a lengthwise separation of optical fiber ribbon C into two optical fiber subsets. Each of the two subsets has a number of optical fibers therein, for example, the two subsets include six fibers each.

Known ribbon separation tool 1 has several disadvantages. First, it is limited to separating but a single optical fiber ribbon C per shearing stroke, such that plural ribbons may only be separated in a time-consuming series of shearing strokes. In addition, only two subsets of optical fibers can be made by blades 6,7 per shearing stroke; if numerically different subsets of optical fibers are needed, blades 6,7 must be replaced with different sized blades which will result in numerically different subsets of optical fibers. Replacing blades 6,7 is a time consuming procedure; moreover, an expensive inventory of different sized blades 6,7 must be maintained. In a further disadvantage, as best seen in FIG. 3, the only way to adjust the length of the shearing stroke of reciprocal member 3 is by adjusting a screw 8 with a special tool, e.g. an Allen wrench. This is disadvantageous because making such an adjustment is a time-consuming procedure, and because a craftsman must keep such a special tool on hand to make the adjustments as needed. Furthermore, gap G, which exists between reciprocal member 3 and housing 2 and which allows space for the shearing stroke of reciprocal member 3, is exposed to the outside environment of ribbon separation tool 1. Such exposure is a problem because foreign matter may enter gap G and decrease or altogether block movement of reciprocal member 3 along its line of action L, thereby resulting in an incomplete or a non-shearing of optical fiber ribbon C. Additionally, as cover members 9 and blades 7 are separated at line S, the covers 9 may move independently of each other; consequently, blades 7 may be misaligned during the shearing stroke, possibly causing damage to optical fiber ribbon C and optical fibers F. Moreover, shearing blades 6,7 are not multi-edged: when either of the blades becomes dulled from use, it must be removed, and either sharpened and re-used or altogether replaced with a fresh blade.

OBJECTS OF THE INVENTION

In view of the foregoing, it is an object of the present invention to provide a ribbon separation tool which is capable of simultaneously separating a plurality of optical fiber ribbons in a single shearing stroke.

Another object of the present invention is to provide a ribbon separation tool which is capable of simultaneously separating plural optical fiber ribbons into numerically different subsets of optical fibers in a single shearing stroke.

A further object of the present invention is to provide a ribbon separation tool having an adjustable shearing stroke, whereby the shearing stroke can be easily adjusted, without a tool, to accommodate wearing of the blades and to accommodate optical fiber ribbons having variations in their respective thicknesses.

Another object of the present invention is to provide a ribbon separation tool which is protected from the entry of foreign matter.

It is a further object of the present invention to provide a ribbon separation tool having multi-edged inserts, whereby a shearing edge being dulled from use is, by turning of the insert, replaceable with another of the shearing edges of the multi-edged insert, such other shearing edge being a fresh shearing edge for the shearing of optical fiber ribbons.

BRIEF DESCRIPTION OF THE DRAWINGS

FIG. 1 is a cross sectional view of a conventional optical fiber ribbon having twelve optical fibers.

FIG. 2 is an isometric view of a known optical fiber ribbon separation tool for separating a single optical fiber ribbon into optical fiber subsets.

FIG. 3 is a cross sectional view of the known ribbon separation tool of FIG. 2.

FIG. 5 is an isometric assembly view of the ribbon separation tool of FIG. 4 showing three optical fiber ribbons arranged for insertion into the ribbon separation tool.

FIG. 6 is an enlarged isometric view of three optical fiber ribbons separated into optical fiber subsets with the ribbon separation tool of the present invention.

FIG. 7 is an enlarged sectional view of a separated optical fiber ribbon.

FIG. 13 is a cross sectional view, similar to FIG. 12 showing the ribbon separation tool in the actuated position whereby the optical fiber ribbons have been sheared.

FIG. 14 is an enlarged sectional view showing a carrier of the ribbon separation tool in an initial position prior to shearing of the optical fiber ribbons.

FIG. 15 is an enlarged sectional view showing the carrier in the actuated position whereby the optical fiber ribbons have been sheared.

DETAILED DESCRIPTION OF THE INVENTION

Figure 4:
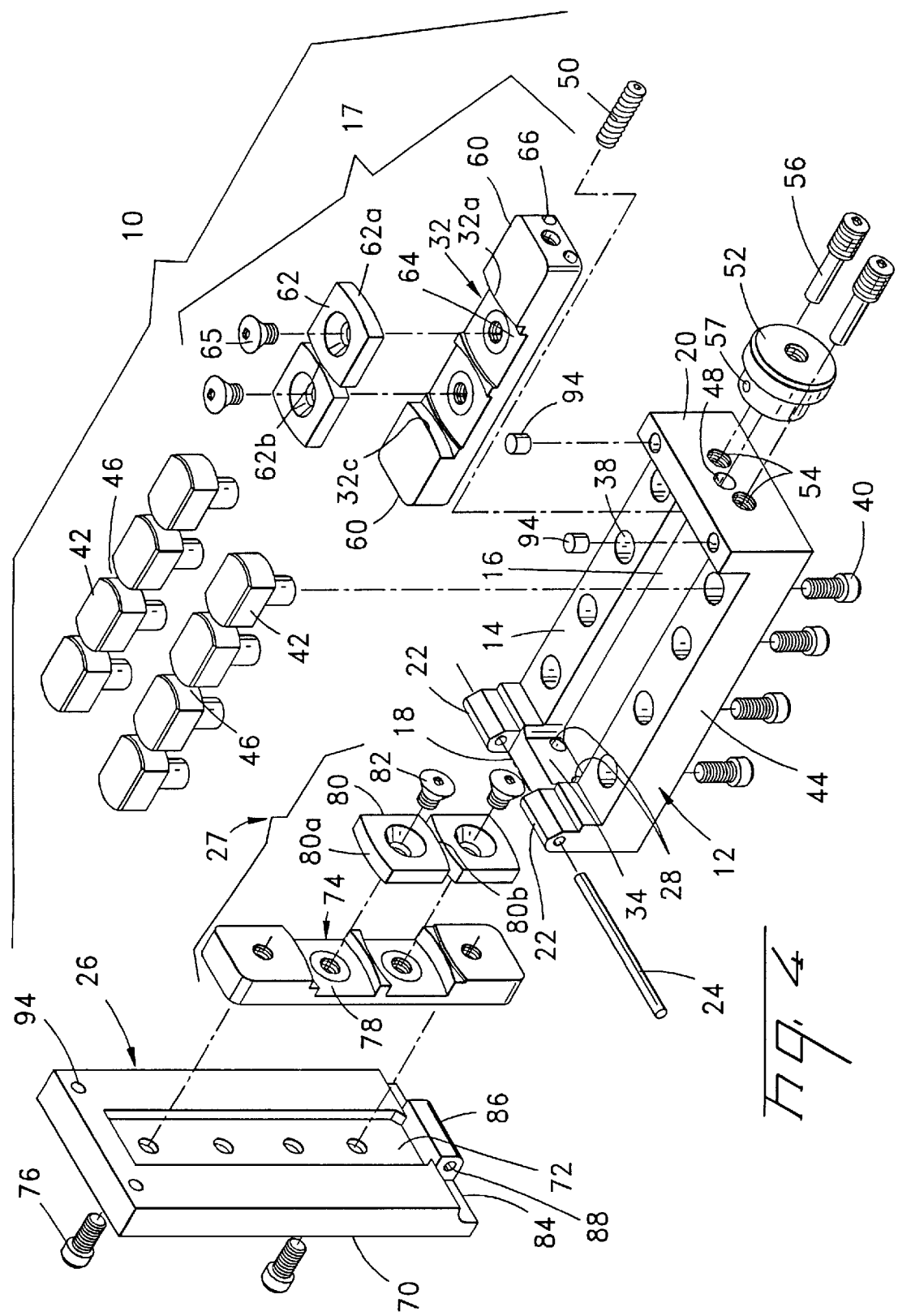
FIG. 4 is an exploded isometric view of a ribbon separation tool according to the present invention.
Figure 8:
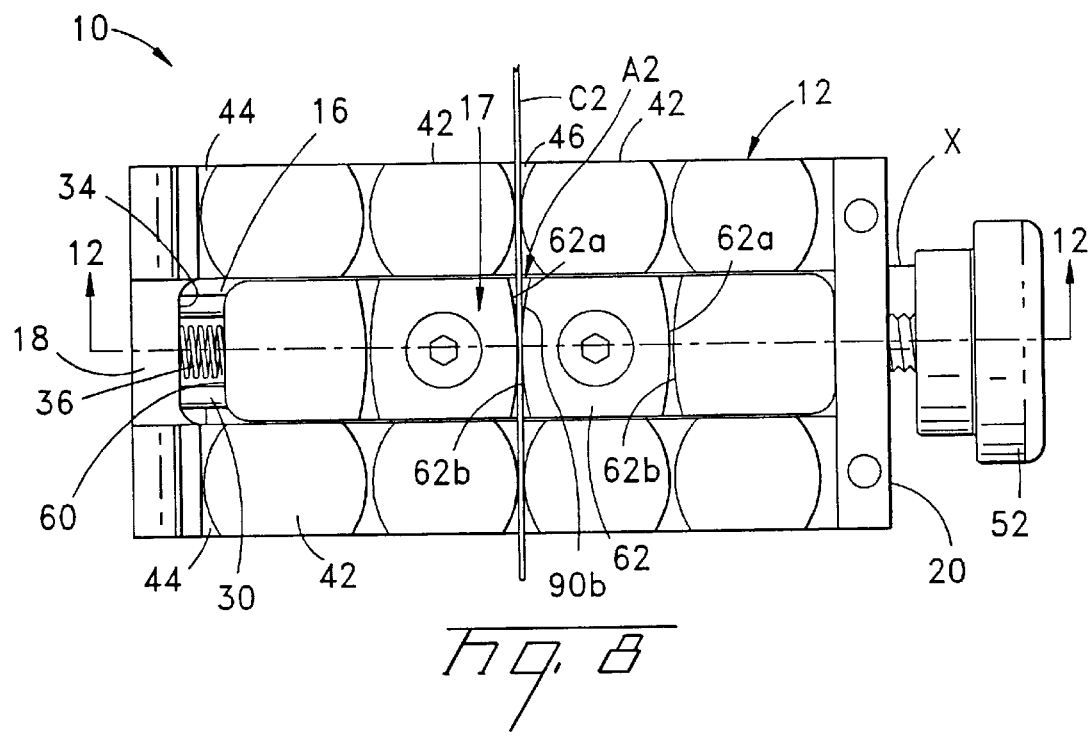
FIG. 8 is a top view of an optical fiber ribbon positioned in the ribbon separation tool of FIG. 5.
Figure 11:
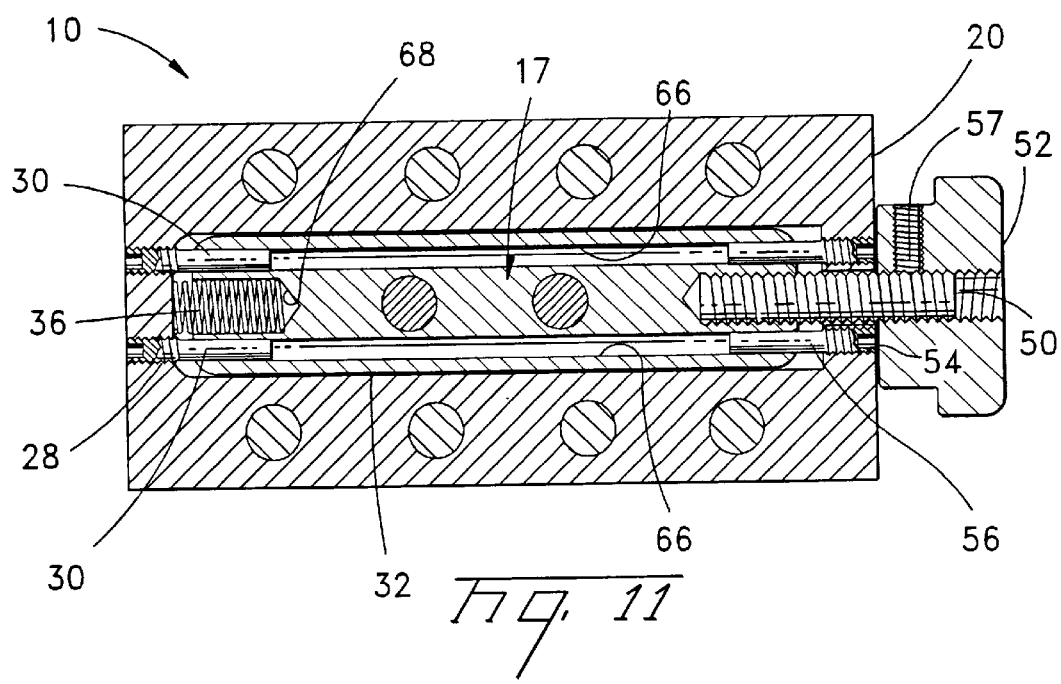
FIG. 11 is a cross sectional view taken through the ribbon separation tool of the present invention, along line 11—11 of FIG. 12.

Referring to FIGS. 4–15, a ribbon separation tool 10 according to the present invention will be described. FIG. 4 is an exploded view illustrating virtually all of the component parts of ribbon separation tool 10. Ribbon separation tool 10 comprises a base 12 having a floor 14. Floor 14 includes a longitudinal recess 16 formed therein and a pair of end walls 18,20. Recess 16 is sized to receive a moveable shearing device 17 therein. End wall 18 includes a pair of spaced-apart shoulders 22 for slidably receiving a rod 24 therethrough, and end wall 18 includes a pair of threaded apertures 28 for threadably receiving a pair of slide rods 30 (FIG. 11). In addition, end wall 18 includes a spring interface surface 34, between apertures 28, for assisting in the compression of a spring 36 during a shearing stroke of moveable shearing device 17 (FIG. 8).

Floor 14 includes apertures 38 for receiving respective threaded fastening members 40. Fastening members 40 are arranged to threadably engage and secure ribbon support elements 42 along sides 44 of base 12. In a preferred embodiment of the present invention, ribbon support elements 42 define respective slots 46 therebetween for respectively receiving optical fiber ribbons (FIGS. 5 and 8). Ribbon support elements 42 include arcuate guide surfaces for guiding the optical fiber ribbons during insertion thereof into tool 10 and pulling therethrough.

Referring to FIG. 4, end wall 20 includes an aperture 48 for slidably receiving a threaded connecting member 50. Connecting member 50 threadably engages and extends between a pusher member 52 and moveable shearing device 17 (FIG. 11). End wall 20 includes threaded apertures 54, which are aligned with threaded apertures 28 in end wall 18. Threaded apertures 28,54 threadably receive respective slide rods 30,56 and slidably secure moveable shearing device 17 within recess 16 (FIG. 11).

Moveable shearing device 17 includes a carrier 32, multi-edged inserts 62, and threaded fasteners 65. Carrier 32 is preferably formed of a stainless steel material, which permits the machining of sharp shearing edges 32a,32c thereon. Carrier 32 comprises end portions 60 and complementary recesses 64 for receiving multi-edged inserts 62. Multi-edged inserts 62 are preferably formed of high quality steel and each include a first shearing edge 62a and a second shearing edge 62b. Threaded fasteners 65 secure multi-edged inserts 62 to carrier 32 within recesses 64. Fasteners 65 are removeable whereby multi-edged inserts 62 can be advantageously turned 180 degrees and re-tightened when either of shearing edges 62a,62b becomes worn from use; whereby, a shearing edge being dulled from use is, by turning of the multi-edged insert, replaceable with another of the shearing edges of the multi-edged insert, such other shearing edge being a fresh shearing edge for the shearing of optical fiber ribbons. As best seen in FIG. 11, carrier 32 includes a pair of longitudinally oriented apertures 66 for slidably receiving slide rods 30, 56. Additionally, carrier 32 includes a spring retaining recess 68 (FIG. 11).

Cover member 26, shown in isolation in FIG. 4, comprises an elongated housing 70 having a recess 72 therein for receiving a stationary shearing device 27. Stationary shearing device 27 includes a carrier 74, multi-edged inserts 80, and fasteners 82. Carrier 74 is mounted to housing 70 by fasteners 76. Carrier 74 includes a pair of recesses 78 for receiving multi-edged inserts 80 having shearing edges 80a,80b. Multi-edged inserts 80 are removably secured to carrier 74 with fasteners 82; whereby, a shearing edge being dulled from use is, by turning of the multi-edged insert, replaceable with another of the shearing edges of the multi-edged insert, such other shearing edge being a fresh shearing edge for the shearing of optical fiber ribbons. Cover member 26 includes an edge 84 with an extension 86 having an aperture 88 for hingeable connection of cover member 26 between shoulders 22 of base 12. Cover member 26 and base 12 include magnets 94 for maintaining cover member 26 in a closed position (FIG. 13).

FIG. 5, as noted above, shows optical fiber ribbons C1,C2,C3 arranged for insertion into respective slots 46. In a preferred embodiment of the present invention, ribbon separation tool 10 is capable of simultaneously separating up to three optical fiber ribbons in a single shearing stroke. At least one side 44 of base 12 may be provided with indicia I which identifies the subsets into which the optical fibers may be separated. FIG. 6 shows ribbons C1,C2,C3 after they have been partially separated by ribbon separation tool 10 such that each optical fiber ribbon has been, in accordance with indicia I, separated into two subsets; for example, ribbon C1 has been separated into two 6-fiber subsets, ribbon C2 has been separated into 4-fiber and 8-fiber subsets, and ribbon C3 has been separated into 2-fiber and 10-fiber subsets.

Figure 9:
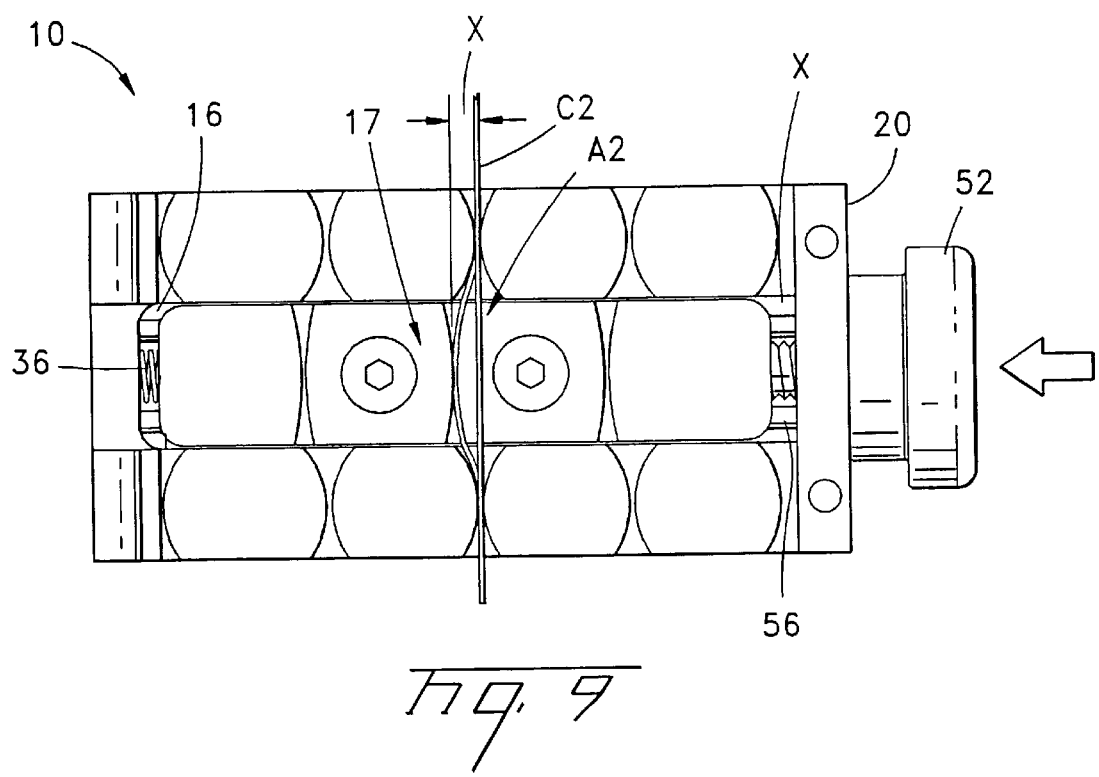
FIG. 9 is a top view comparable to FIG. 8 showing the optical fiber ribbon after being sheared.
Figure 10:
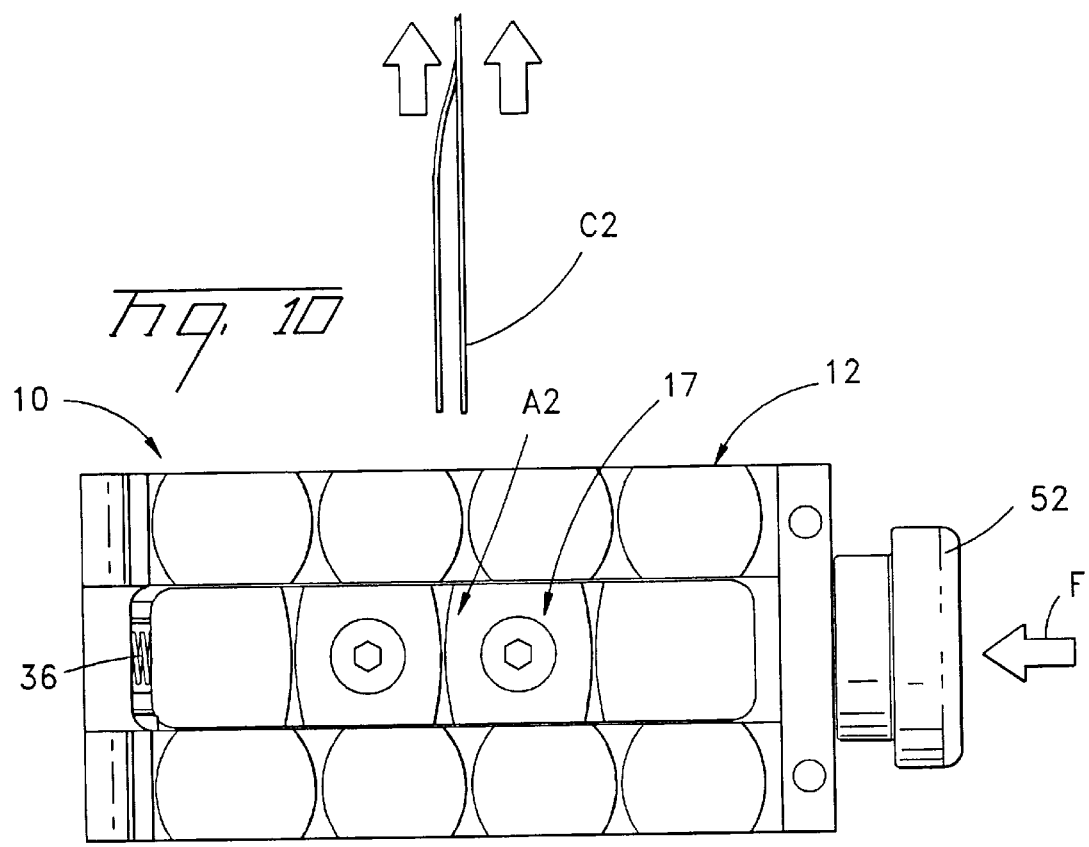
FIG. 10 is a top view similar to FIG. 9 showing the optical fiber ribbon after being separated lengthwise.

Ribbon separation tool 10 advantageously has an easily adjustable shearing stroke, whereby the stroke of ribbon separation tool 10 can be varied to accommodate wear of shearing edges and/or optical fiber ribbons having variations in their respective thicknesses. Referring to FIG. 8, pusher member 52 is separated from end wall 20 a variable distance X, which is equal to the distance that carrier 32 can be moved. As shown in FIGS. 7 and 9, distance X is equal to the shearing stroke of moveable shearing device 17. Referring to FIG. 11, a set screw 57 holds pusher member 52 fast on connecting member 50, and pusher member 52 is threadably mounted to connecting member 50. Adjustment of pusher member 52 relative to housing 12 varies distance X. Rotation of pusher member 52 toward end wall 20 lessens the shearing stroke, and rotation of pusher member 52 away from end wall 20 lengthens the shearing stroke. This is an easy shearing stroke adjustment operation which can be accomplished manually without the use of a tool. However, distance X and the shearing stroke cannot exceed the distance between base end portion 60 and spring biasing surface 34 (FIG. 8). The shearing stroke of ribbon separation tool 10 can be adjusted to compensate for optical fiber ribbons manufactured with differing thicknesses, and worn shearing edges or surfaces of carrier 32, multi-edged inserts 62, carrier 74, and multi-edged inserts 80. Moreover, free and complete movement of carrier 32 during the shearing stroke is assured by the protection of the space between portion 60 and surface 34 from the entry of foreign matter, such protection being afforded at least by cover member 26, support members 42, end wall 18, and sides 44.

Figure 12:
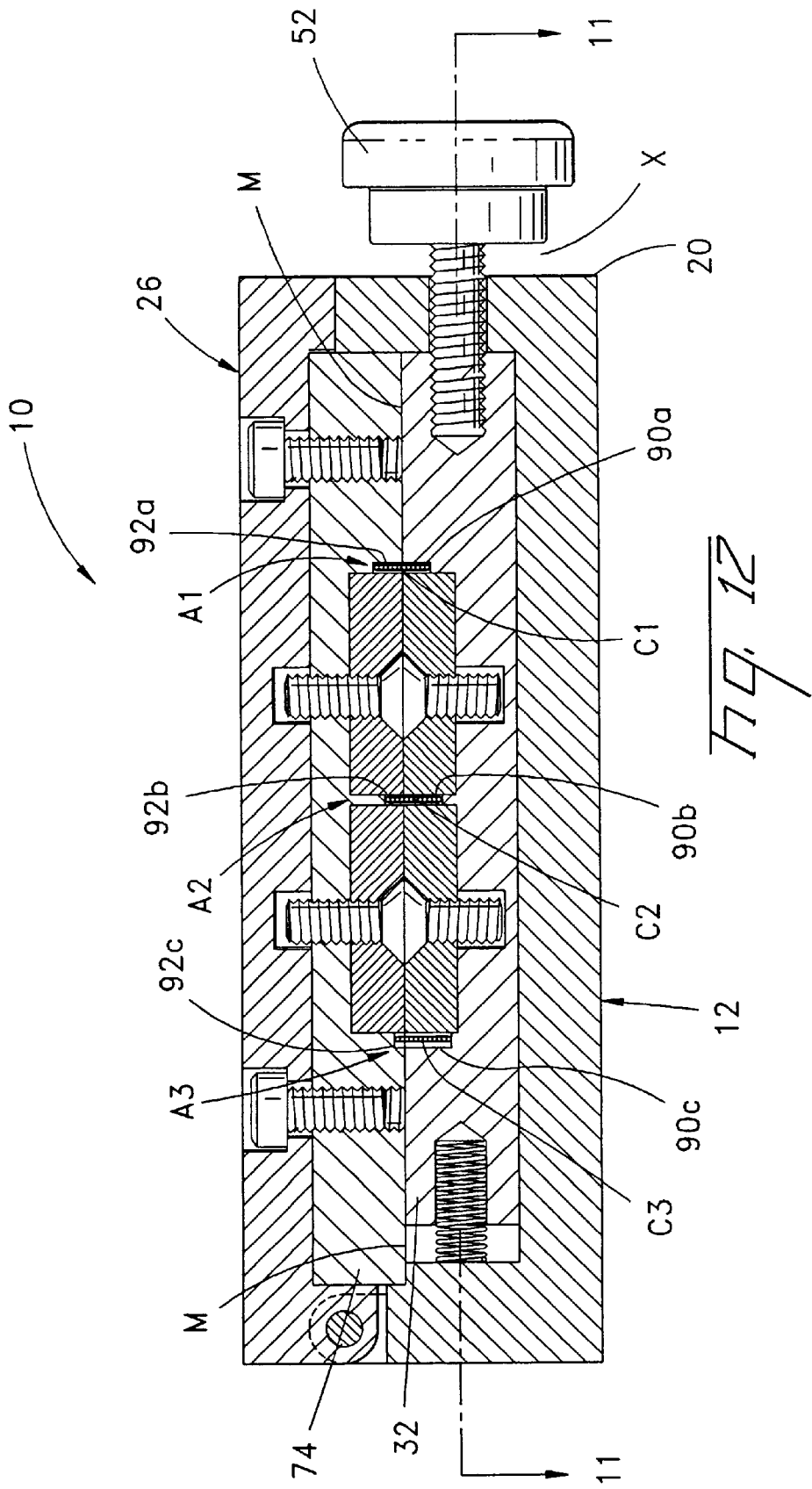
FIG. 12 is a cross sectional view of the ribbon separation tool taken along line 12—12 of FIG. 8.
Figure 17:
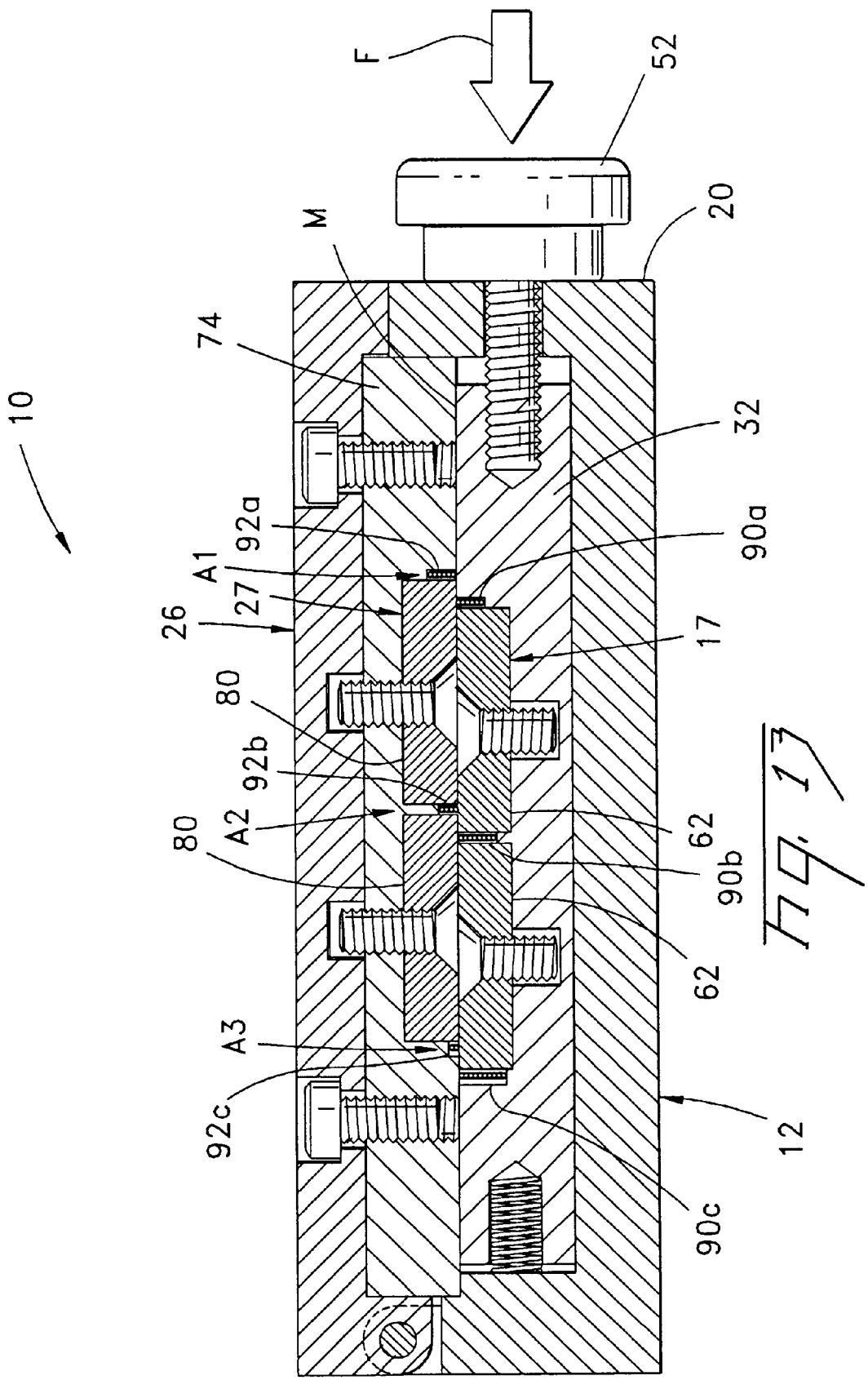

As noted above, ribbon separation tool 10 may advantageously effect the simultaneous separation of a plurality of optical fiber ribbons with a single stroke, and, moreover, tool 10 may form different optical fiber subsets. Ribbon separation tool 10 includes stationary sub-slots 92a,92b,92c, and corresponding moveable sub-slots 90a,90b,90c (FIG. 12). When cover member 26 is in a closed position, stationary sub-slots 92a,92b,92c are aligned with moveable sub-slots 90a,90b,90c to define shearing stations A1,A2,A3 comprising respective shearing slots 90a,92a; 90b,92b; and 90c,92c. Shearing slots 90a,92a; 90b,92b; and 90c,92c each straddle a shearing plane M defined between moveable shearing device 17 and stationary shearing device 27 (FIG. 12). The respective shearing slots 90a,92a; 90b,92b; and 90c,92c of shearing stations A1,A2,A3 are sized to respectively receive ribbons C1,C2,C3, the respective widths of the slots being preferably about 0.50–0.75 mm in width. This width range is preferable because it avoids fiber breakage and binding of the fibers and/or matrix material during the shearing stroke, and results in the desired number of optical fibers per subset. Shearing plane M transects ribbons C1,C2,C3, between optical fibers thereof, and at respective locations between the sub-slots where the ribbons are to be separated, as exemplified by ribbon C2 shown in FIG. 7. However, to form optical fiber subsets in ribbons C1,C2,C3, the ribbons are longitudinally spaced along shearing plane M. To form numerically different subsets, ribbons C2 and C3 are unequally divided by shearing plane M. For example, as shown in FIG. 12, ribbons C1,C2,C3 are spaced along and divided by shearing plane M such that, when tool 10 is actuated: ribbon C1 will be separated into two 6-fiber subsets in shearing station A1; ribbon C2 will be separated into one 4-fiber and one 8-fiber subset in shearing station A2; and ribbon C3 will be separated into one 2-fiber subset and one 10-fiber subset in shearing station A3.

Referring to FIGS. 12–15, actuation of ribbon separation tool 10 will be further described. At the start of the ribbon separation cycle, and as described above, optical fiber ribbons C1,C2,C3 are aligned with respective slots 46 and shearing stations A1,A2,A3, and are then inserted through ribbon separation tool 10, e.g. as exemplified by ribbon C2 shown in FIG. 8. With reference to FIGS. 12 and 14, when ribbons C1,C2,C3 are positioned within shearing slots 90a, 92a; 90b,92b; and 90c,92c of shearing stations A1,A2,A3, a pushing force F is applied to pusher member 52 (FIG. 13), which causes moveable shearing device 17 to move to an actuated position relative to stationary shearing device 27. As this occurs, moveable subslots 90a,90b,90c are moved out of alignment with stationary subslots 92a,92b,92c whereby ribbons C1,C2,C3 are sheared into optical fiber subsets (FIGS. 13 and 15). While maintaining pusher member 52 in the actuated position, optical fiber ribbons C1,C2, C3 are pulled through tool 10 in the direction they were inserted, or are withdrawn from shearing stations A1,A2,A3 opposite to the direction of insertion. When so pulled through or withdrawn from tool 10, the ribbons are separated lengthwise by, e.g. arcuate edges 62a,62b as shown by the withdrawal of ribbon C2 in FIG. 10. Thus the arcuate shearing edges of inserts 62,80 and carriers 32,74 advantageously permit a ribbon to be separated in either direction of removal from tool 10. In the preferred embodiment, actuation of tool 10 with respect to ribbons C1,C2,C3 results in the formation of two 6-fiber subsets, and numerically different subsets of 2, 4, 8, and 10 fibers each suitable for connectorization. Pusher member 52 is then released and spring 36 is operative to move moveable shearing device 17 and pusher member 52 back to their initial positions. One complete cycle of ribbon separation tool 10 has thus been completed. If desired, some of the optical fiber subsets may be again sheared to form smaller optical fiber ribbon subsets.

The present invention has been described with reference to the foregoing embodiment, which embodiment is intended to be illustrative of the present inventive concept rather than limiting. Persons of ordinary skill in the art will appreciate that variations and modifications of the foregoing embodiment may be made without departing from the scope of the appended claims. Although the present invention has been described with reference to a manually operated ribbon separation tool, the tool of the present invention can be incorporated into a machine. For example, pusher member 52 may be operatively connected to an electric motor, or a hydraulic or pneumatic cylinder, and tool 10 actuated accordingly. Additionally, although multi-edged inserts 62,80 have been described with reference to shearing edges 62a,62b;80a,80b, i.e. two shearing edges per insert, inserts 62,80 can be modified to include four shearing edges each; whereby, only a quarter turn of an insert would be needed to replace a shearing edge dulled from use with another shearing edge being a fresh shearing edge for shearing optical fiber ribbons. Furthermore, although the present invention has been described with reference to moveable and stationary shearing devices, the present invention may be adapted to have both shearing devices move in opposing directions during the shearing stroke. The present invention may be adapted to form numerically different subsets than those described above, with more or less shearing stations, for example the tool of the present invention can be adapted to separate four 24-fiber ribbons into subsets of twelve optical fibers each.

Accordingly, what is claimed is:

1. A ribbon separation tool, comprising:

at least two shearing devices, at least one of said shearing devices being a movable shearing device operative to move in a shearing stroke relative to the other of said shearing devices; said shearing devices defining at least two shearing stations each comprising a respective shearing slot;

said shearing devices cooperating to define a shearing plane therebetween, said shearing plane being common to each of said shearing slots, so that each of said shearing slots straddles said shearing plane and said shearing plane transects each of said shearing slots thereby defining respective sub-slots of said shearing slots.

2. The ribbon separation tool of claim 1, the sub-slots of at least one of said shearing slots being unequally positioned with respect to said shearing plane for separating an optical fiber ribbon into subsets of optical fibers having respective numerically unequal optical fiber counts.

3. The ribbon separation tool of claim 1, a portion of said tool being disposed between said shearing slots to guide insertion of ribbons whereby insertion of said ribbons occurs on respective, discrete ribbon insertion paths with said portion of said tool separating said ribbon insertion paths one from another.

4. A ribbon separation tool, comprising:

at least two shearing devices, at least one of said shearing devices being operative to move in a shearing stroke relative to the other of said shearing devices, a shearing plane defined between said shearing devices;

at least two shearing stations, each said shearing station comprising respective shearing slots for receiving respective optical fiber ribbons therein;

said shearing slots each including at least one respective alignment surface for supporting said respective optical fiber ribbons and maintaining alignment of said respective optical fiber ribbons during said shearing stroke.

5. The ribbon separation tool of claim 4, said shearing stations being spaced apart along said movable shearing device, whereby actuation of said moveable shearing device in said shearing stroke can simultaneously separate each said respective optical fiber ribbon into respective subsets of optical fibers.

6. The ribbon separation tool of claim 4, a portion of said tool being disposed between said shearing slots to guide insertion of said ribbons whereby insertion of said ribbons occurs on respective, discrete ribbon insertion paths with said portion of said tool separating said ribbon insertion paths one from another.

7. A ribbon separation tool, comprising:

at least two shearing devices, at least one of said shearing devices being a movable shearing device operative to move in a shearing stroke relative to the other of said shearing devices;

said shearing devices defining at least two shearing stations, said shearing devices cooperating to define a shearing plane therebetween and said shearing stations comprising respective shearing slots, at least one of said shearing slots comprising a width of about 0.50 mm to about 0.75 mm for receiving at least one optical fiber ribbon therein;

said at least one optical fiber ribbon being positionable in said at least one shearing slot with respect to said shearing plane so that during said shearing stroke said at least one optical fiber ribbon is separable into subsets of optical fibers.

8. The ribbon separation tool of claim 7, a portion of said tool being disposed between said shearing slots to guide insertion of said ribbons whereby insertion of said ribbons occurs on respective, discrete ribbon insertion paths with said portion of said tool separating said ribbon insertion paths one from another.

9. A ribbon separation tool, comprising:

at least two shearing devices, at least one of said shearing devices being a movable shearing device operative to move in a shearing stroke relative to the other of said shearing devices;

said shearing devices defining at least two shearing stations, said shearing devices cooperating to define a shearing plane therebetween and said shearing stations comprising respective shearing slots, at least one of said shearing slots generally surrounding at least one optical fiber ribbon inserted into said at least one shearing slot;

said at least one optical fiber ribbon being positionable in said at least one shearing slot so that during said shearing stroke said at least one optical fiber ribbon is separable into subsets of optical fibers.

10. The ribbon separation tool of claim 9, a portion of said tool being disposed between said shearing slots to guide insertion of said ribbons whereby insertion of said ribbons occurs on respective, discrete ribbon insertion paths with said portion of said tool separating said ribbon insertion paths one from another.

\* \* \* \* \*